United States Patent [19]
Beerwart

[11] Patent Number: 5,814,413
[45] Date of Patent: Sep. 29, 1998

[54] MULTILAYER PROTECTIVE GARMENT FILM

[75] Inventor: Fred Beerwart, Columbus, Ind.

[73] Assignee: Huntsman United Films Corporation, Salt Lake City, Utah

[21] Appl. No.: 478,196

[22] Filed: Jun. 7, 1995

[51] Int. Cl.$^6$ .................................................. B32B 27/32
[52] U.S. Cl. ...................... 428/516; 428/500; 428/519; 428/141; 525/240
[58] Field of Search ..................... 428/506, 516, 428/519, 141; 525/240

[56] References Cited

U.S. PATENT DOCUMENTS

| | | | |
|---|---|---|---|
| 5,482,771 | 1/1996 | Shaw | 428/349 |
| 5,543,223 | 8/1996 | Shaw | 428/349 |
| 5,558,930 | 9/1996 | DiPoto | 428/216 |
| 5,587,247 | 12/1996 | Kubo et al. | 425/523 |
| 5,593,747 | 1/1997 | Georgelos | 428/36.7 |

*Primary Examiner*—Charles Nold
*Attorney, Agent, or Firm*—Russell R. Stolle; Ron D. Brown; Robert M. O'Keefe

[57] ABSTRACT

The present multilayer coextruded polymer films, are made up of one or more layers which contain 20 to 100 percent by weight of a first polymer resin selected from the group consisting of a terpolymer of ethylene, butene and hexene produced using a metallocene single site catalyst, a copolymer of ethylene and hexene produced using a metallocene single site catalyst and a copolymer of ethylene and butene produced using a metallocene single site catalyst, ; and 0 to 80 percent of a second polymer resin selected from the group consisting of low density polyethylene, linear low density polyethylene, ultra low density polyethylene, very low density polyethylene, a terpolymer of ethylene, butene and hexene produced using a metallocene single site catalyst which is different from that used as the first polymer resin, a copolymer of ethylene and hexene produced using a metallocene single site catalyst which is different from that used as the first polymer resin, a copolymer of ethylene and butene produced using a metallocene single site catalyst which is different from that used as the first polymer resin, ethylene vinyl acetate and ethylene methyl acrylate. These materials are useful, for example, in the preparation of protective garments for use by medical personnel or in the meat processing industry.

14 Claims, 1 Drawing Sheet

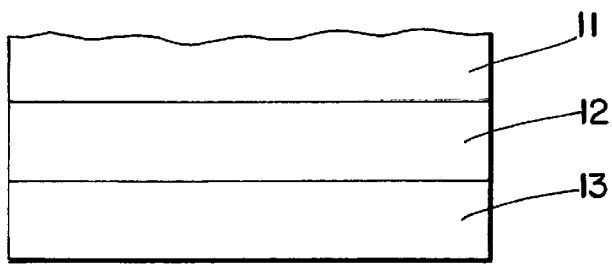
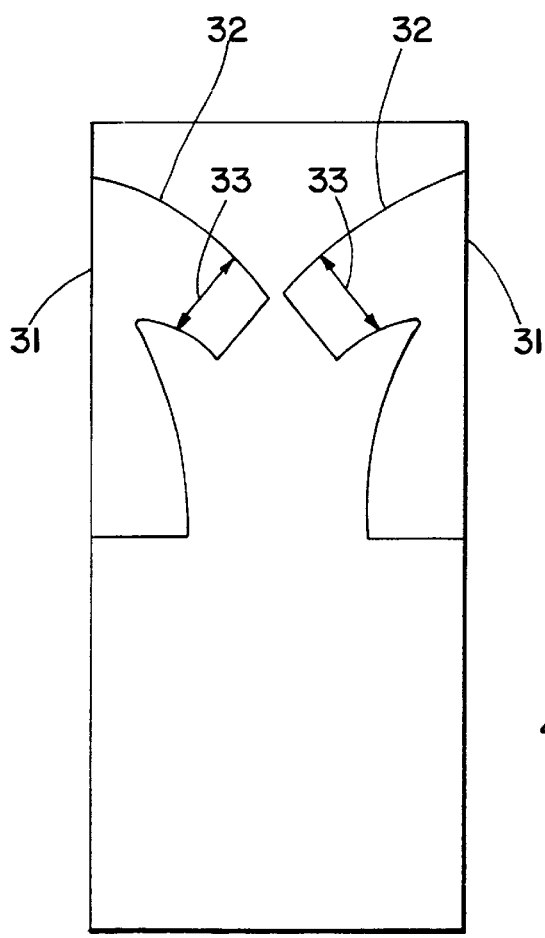
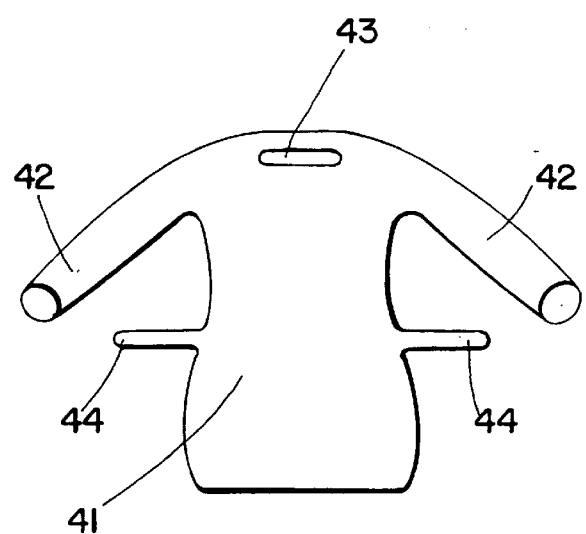

MULTILAYER PROTECTIVE GARMENT FILM

FIELD OF THE INVENTION

The present invention relates to multilayer blown coextruded polymer films. These films can be used, for example, to form protective garments. The protective garments can be used in a variety of industries, for example as protective garments for meat processing industry or as protective garments for use by medical personnel.

BACKGROUND OF THE INVENTION

Protective garments are used to provide clothing and bodily protection from blood and many of the other undesirable materials which are present in a meat processing plant. These garments are resistant to puncture and tearing from bones and other sharp objects and are also resistant to knife cutting.

Currently, the most common protective garment used during meat processing is a three piece vinyl system. This system consists of an apron and two tubular sleeve protectors (one for each arm). Each sleeve protector has an elastic band attached circumferentially at both ends to provide a tight fit at each end of the tube.

This system, while providing some protection from the harsh meat processing environment, also suffers from significant disadvantages. For example, the vinyl system does not provide protection in the uncovered areas between the apron and the sleeve; the vinyl has an unpleasant aroma; the vinyl system can restrict mobility due to its relative stiffness and thickness; vinyl system is heavy due to its density and thickness; the elastic bands on the sleeve protectors can be uncomfortable; and the vinyl materials are not known to be recyclable.

Accordingly, it would be desirable to provide a protective garment which has a single integrated structure; adequate tear and cutting resistance; light weight; lower stiffness; no elastic bands; no offensive aroma; and which is made from recyclable materials.

Accordingly, it is an object of the present invention to provide a light-weight, tear resistant coextruded polymer film which is suitable for use in the manufacture of protective garments.

It is another object of the present invention to provide a protective garment which is tear resistant, has a one-piece structure, and is manufactured from material which can be recycled.

It is a further object of the present invention to provide an economical method for the manufacture of protective garments which minimizes material waste.

SUMMARY OF THE INVENTION

One embodiment of the present invention is a multilayer coextruded polymer film with superior texture and excellent physical properties. In this multilayer coextruded polymer film, each layer independently comprises:
(a) 20 to 100 percent by weight of a first polymer resin selected from a terpolymer of ethylene, butene and hexene produced using a metallocene single site catalyst, a copolymer of ethylene and hexene produced using a metallocene single site catalyst, a copolymer of ethylene and butene produced using a metallocene single site catalyst, ultra low density polyethylene ("ULDPE") and very low density polyethylene ("VLDPE"); and
(b) 0 to 80 percent of a second polymer resin selected from the group consisting of low density polyethylene ("LDPE"), linear low density polyethylene ("LLDPE"), ULDPE, VLDPE, a terpolymer of ethylene, butene and hexene produced using a metallocene single site catalyst which is different from that used as the first polymer resin, a copolymer of ethylene and hexene produced using a metallocene single site catalyst which is different from that used as the first polymer resin, a copolymer of ethylene and butene produced using a metallocene single site catalyst which is different from that used as the first polymer resin, ethylene vinyl acetate ("EVA") and ethylene methyl acrylate ("EMA");
wherein, if one layer comprises 100 percent of the first polymer resin, then at least one of the other layers of the multilayer structure is a mixture of the first and second polymer resins.

These layers of the multilayer polymer film may also optionally include small amounts of conventional additives which are used in co-extruded polymer films.

Another embodiment of the present invention is a single layer extruded polymer film comprising a mixture of:
(a) about 97 to 20 percent by weight of a first polymer resin selected from a terpolymer of ethylene, butene and hexene produced using a metallocene single site catalyst, a copolymer of ethylene and hexene produced using a metallocene single site catalyst, a copolymer of ethylene and butene produced using a metallocene single site catalyst, ULDPE, and VLDPE; and
(2) about 3 to 80 percent of a second polymer resin selected from the group consisting of LDPE, LLDPE, ULDPE, VLDPE, a terpolymer of ethylene, butene and hexene produced using a metallocene single site catalyst which is different from that used as the first polymer resin, a copolymer of ethylene and hexene produced using a metallocene single site catalyst which is different from that used as the first polymer resin, a copolymer of ethylene and butene produced using a metallocene single site catalyst which is different from that used as the first polymer resin, EVA and EMA.

A further embodiment of the present invention is a one piece protective garment with an integrated body protective portion and sleeve protective portions. These types of garments can be used, for example, in the meat processing industry.

Another embodiment of the present invention is a method for the manufacture of a one-piece protective garment.

Another embodiment of the present invention is a conventional protective garment, such as an apron, which is manufactured from the present films.

Another embodiment of the present invention is a sleeve protector, which is an arm-length tube manufactured from the present films. The sleeve protector should include means, such as elastic, at either end for securing the protector to the arm and providing a secure fit and seal around the arm.

BRIEF DESCRIPTION OF THE DRAWINGS

FIG. 1 shows a cross-sectional view of a three layer coextruded film of the present invention.

FIG. 2 shows a view of a pattern which can be stamped from the extruded film and formed into a protective garment.

FIG. 3 shows a drawing of a protective garment of the present invention.

DETAILED DESCRIPTION OF THE INVENTION

The present polymer films provide a light-weight, tear and cut resistant, environmentally friendly film which can be used for a variety of purposes. For example, the present films can be used to manufacture protective clothing for the meat processing industry. Alternatively, the present films can be used as protective garments for medical personnel, in order to protect them, for example, from blood and other bodily fluids. In addition, thicker versions of the present films can be used to manufacture body bags for use by medical examiners, the police and the military.

In contrast to known vinyl protective garments, the protective garments made from the present films can be formed into protective garments with an integrated body protective portion and sleeve protectors. This garment avoids the problems associated with the use of vinyl, as set forth above. Alternatively, the protective garment can be an apron. Finally, the present films can be used to form sleeve protectors.

I. The Polymer Film

The present polymer film comprises one or more extruded layers. The film can be formed by conventional extrusion techniques, such as blown extrusion or coextrusion (for multilayer films) and cast extrusion or coextrusion (for multilayer films). Preferably, the present films are formed by blown extrusion or co-extrusion.

The present film can consist of a single layer polymer film, or can be a multilayer polymer film. The multilayer films may contain as many as layers as can be conveniently produced by coextrusion. Preferably, the polymer film comprises one to six layers. One preferred multilayer film is a three layer film.

The present polymer films, whether multilayer films or single layer films, may be textured or untextured. Preferably, the surface of the film which serves as the outer surface of the protective garment is textured. The presence of this texturing provides several advantages for the protective garment. For example, it provides a good seal between the sleeves of the garment and protective gloves, without the need for elastic. In addition, it provides the garment with a more desirable physical appearance.

The surface texturing of the polymer film is accomplished by taking advantage of a known property of extruded films. Extruded films, under certain temperature conditions, undergo melt fracture, which causes a rough texture on the surface of the extruded film. The presence of melt fracture is generally viewed by those skilled in the extrusion art as an undesirable result. Accordingly, those skilled in the art use known techniques to manipulate the extrusion conditions to avoid its occurrence.

To produce a textured film, it is merely necessary to determine the extrusion conditions at which the film undergoes melt fracture and then extrude the film under those conditions. If a multilayer film is being formed, the outer layers can be selectively textured by controlling the extrusion conditions. For example, the top layer can be textured, while the bottom remains untextured, by controlling the die temperatures during extrusion.

The films can be produced in any desired thickness producible by extrusion or co-extrusion. The optimum thickness of any particular film will depend on the desired use. For example, for use as the protective garment for meat processing, the film should have a thickness from about 1 to 8 mils. Preferably, when used to form a protective garment, the coextruded films have a thickness in the range from about 2 mils to 6 mils. However, for other uses, such as body bags, a thicker film is desirable, for example, 12 mils or greater.

A. The Multilayer Polymer Film

The layers of the present multilayer film comprise a mixture of a first resin material and a second resin material. The relative amounts of these materials in each layer can vary independently in a multilayer structure. Thus, in a three layer film, the outer layer can have a different proportion of the first polymer resin and the second polymer resin, as compared to the center layer.

The first resin material is selected from a terpolymer of ethylene, butene and hexene produced using a metallocene single site catalyst, a copolymer of ethylene and hexene produced using a metallocene single site catalyst, a copolymer of ethylene and butene produced using a metallocene single site catalyst, VLDPE and ULDPE.

Preferably, the first resin material is a terpolymer of ethylene, butene and hexene produced using a metallocene single site catalyst, a copolymer of ethylene and hexene produced using a metallocene single site catalyst, or a copolymer of ethylene and butene produced using a metallocene single site catalyst. A preferred first resin material is a terpolymer of ethylene, butene and hexene produced using a metallocene single site catalyst. The terpolymers and copolymers formed using the metallocene single site catalysts are commercially available materials which are manufactured by the Exxon Corporation. Non-limiting examples of suitable terpolymers include those available from the Exxon Corporation under the tradenames Exact 4015, Exact 5008 and Exact 3025. One preferred material for use as the first resin material is Exact 4015.

The first resin is present in each layer in an amount from about 100 percent to about 20 percent by weight, provided that if the first resin is present in one layer in an amount of 100 percent by weight, the multilayer film contains at least one additional layer which contains a combination of the first resin and the second resin. It is preferred that the amount of the first resin component be a higher percentage, as this provides enhanced properties in the final film.

One preferred amount of the first resin is in the range from about 70 to about 95 percent by weight. Another preferred amount for the first resin is in the range from about 85 to 90 percent.

The second resin material is selected from the group consisting of low density polyethylene ("LDPE"), linear low density polyethylene ("LLDPE"), ultra low density polyethylene ("ULDPE"), very low density polyethylene ("VLDPE"), a terpolymer of ethylene, butene and hexene produced using a metallocene single site catalyst which is different from that used as the first polymer resin, a copolymer of ethylene and hexene produced using a metallocene single site catalyst which is different from that used as the first polymer resin, a copolymer of ethylene and butene produced using a metallocene single site catalyst which is different from that used as the first polymer resin, ethylene vinyl acetate ("EVA") and ethylene methyl acrylate ("EMA"). One preferred second resin material is LDPE.

The second resin is present in each layer in an amount from 0 to about 80 percent by weight. One preferred amount of the second resin material is an amount in the range from about 5 to 30 percent by weight. Another preferred amount of the second resin material is an amount in the range from about 8 to 15 percent by weight.

Suitable LDPEs for use in the present invention include the commercially available resin Quantum 345-013 which is available from Quantum. LDPE is also commercially available from a number of other chemical or petroleum companies.

Optionally, one or more of the layers in the present multilayer polymer film can include additional additives, such as, for example, coloring agents and slip/antiblocking agents which are known for use in coextruded polymer films. These additives may be added independently to the desired layer in the multilayer film. For example, the central layer of a three layer film may contain a dye, while the outer layers contain a slip/antiblocking agent.

The additive should be present in a layer in an amount from about 0 to 5 percent by weight. Preferably, when present, the additive is present in an amount from about 1 to 3 percent by weight.

Non-limiting examples of suitable additives include: Polycom Huntsman A27354 (slip/antiblock), and Ampacet Blue Concentrate LR 84924 (coloring agent).

FIG. 1 shows a cross section of a three-layer blown coextruded film. This film contains an top layer 11, a central layer 12, and a bottom layer 13. In multilayer films, such as those shown in FIG. 1, the relative percentages of the first polymer resin and the second polymer resin in each layer can be the same or different. For example, in FIG. 1, the center layer 12 in FIG. 1 could have a different ratio of the first and second polymer resins compared to layers 11 and 13.

B. Single Layer Polymer Films

The present single layer polymer films are made up of a mixture of a first polymer resin and a second polymer resin. The materials suitable for use as the first and second polymer resins are the same as those set forth above as suitable for use as the first and second polymer resin for the multilayer film, respectively.

In the single layer film, the first polymer resin should be present in an amount from about 97 to 20 percent by weight. One preferred amount of the first polymer resin is an amount in the range from about 70 to 95 percent by weight. Another preferred amount of the first polymer resin is an amount from about 85 to 92 percent by weight.

In the single layer film, the second polymer resin should be present in an amount in the range from about 3 to 80 percent by weight. One preferred amount of the second polymer resin is an amount in the range from about 5 to 30 percent by weight. Another preferred amount of the second polymer resin is an amount from about 8 to 15 percent by weight.

II. Production of Protective Garments

Preferably, the present films are extruded as a flattened tubular structure. The flattened tubular structure allows the economical and practical production of protective garments. The tubular sleeve can then be easily manufactured into a one-piece protective garment, suitable for use, for example, in the meat processing industry.

In this process, the collapsed or flattened tube of the extruded polymer film is fed into a die cutting machine, where the desired design is cut from the tube. For example, FIG. 2 illustrates a potential design suitable for production of a protective garment. In FIG. 2, fold 31, which is the edge of the tube, provides the center line for the protective garment. Sleeve 32 of the gown is cut so that the total distance 33 is the circumference of the desired size of the sleeve. After the cut gown is removed from the roll, the sleeves 32 are heat sealed in order to form tubular sleeve protectors.

III. Protective Garment

FIG. 3 provides an example of a completed protective garment formed form the present single layer or multilayer polymer film. This protective garment has high strength, is flexible and is resistant to cutting or tearing.

This unitary protective garment comprises a body protective portion 41 which protects the torso and upper legs. The garment also has tubular sleeves 42 which are integral to the body protective portion 41. When worn the user places the garment over his head so that the head passes through hole 43. Ties 44 can be tied together around the waist, securing the protective garment to the wearer.

Other protective garments which can be formed using the present polymer films include conventional aprons and sleeve protectors. One type of apron is formed substantially like the unitary protective garment, only without the integral tubular sleeves.

When used to make sleeve protectors, the film is heat sealed into a tube which is the approximate diameter and length of the human arm. In order for the protector to form a good seal with the protected arm, means for securing the protector are provided at either end of the tube. One example of the means for securing the protector include elastic bands which are incorporated into the sleeve protectors. Alternatively, the tube can be heat treated which causes the end portions to shrink and to thereby form a secure fit on the arm. The securing means can be the same at both ends of the tubular sleeve member or can be different. For example, the sleeve protector may have elastic at one end and a heat-shrunk portion at the other end.

IV. Examples

The following examples are non-limiting working examples which further illustrate the disclosed invention. Modification of the examples as discussed in the text or otherwise known to the skilled artisan are considered within the scope of the invention.

Example 1 Production of a Three-Layer Film

A three-layer blown co-extrusion film was prepared using a Battenfield-Glouchester coextrusion line, with a 14" diameter die, and 45 mm, 3.5 inch and 60 mm extruders. The top layer of this film comprised 20 percent of the total thickness of the multilayer film and was made up of a mixture of 87 percent by weight of Exact 4015, 10 percent by weight of Quantum 345-013 (LDPE) and 3 percent by weight of Polycom Huntsman A27534 (slip/antiblock agent). The center layer, which comprised 60 percent of the total thickness of the multilayer film, was a mixture of 90 percent by weight of Exact 4015, 9 percent by weight Quantum 345-013 (LDPE) and 1 percent by weight of Ampacet LR84924 (a blue coloring agent). The bottom layer, which comprised 20 percent of the total thickness of the multilayer film, was a mixture of 87 percent by weight of Exact 4015, 10 percent by weight of Quantum 345-013 (LDPE) and 3 percent by weight of Polycom Huntsman A27534 (slip/antiblock agent). The extruded film had an overall thickness of 6.4 mils.

The physical properties of the present three layer film were compared with a commercially available vinyl film. The results of this comparison are set forth below in Table 1.

TABLE 1

|  | Vinyl | Example 1 |
|---|---|---|
| Gauge (mil) | 8.0 | 6.4 |
| MD Tensile (psi) | 2974 | 4864 |
| CD Tensile (psi) | 2881 | 4483 |
| MD Elongation (%) | 300 | 919 |
| CD Elongation (%) | 359 | 942 |
| MD Secant Mod (psi) Stiffness | 11,135 | 8,017 |
| CD Secant Mod (psi) Stiffness | 10,489 | 8,138 |

This data clearly shows that the present multilayer films, which was thinner than the vinyl film, nevertheless possessed superior strength and flexibility compared to the vinyl film.

Modifications and variations of the present invention will be obvious to those skilled in the art from the foregoing detailed description of the invention. Such modifications and variations are intended to come within the scope of the appended claims.

I claim:

1. A multilayer coextruded polymer film, wherein each layer independently comprises:

(1) 20 to 100 percent by weight of a first polymer resin selected from the group consisting of a terpolymer of ethylene, butene and hexene produced using a metallocene single site catalyst, a copolymer of ethylene and hexene produced using a metallocene single site catalyst, a copolymer of ethylene and butene produced using a metallocene single site catalyst, ultra low density polyethylene, and very low density polyethylene; and (2) 0 to 80 percent of a second polymer resin selected from the group consisting of low density polyethylene, linear low density polyethylene, ultra low density polyethylene, very low density polyethylene, a terpolymer of ethylene, butene and hexene produced using a metallocene single site catalyst which is different from that used as the first polymer resin, a copolymer of ethylene and hexene produced using a metallocene single site catalyst which is different from that used as the first polymer resin a copolymer of ethylene and butene produced using a metallocene single site catalyst which is different from that used as the first polymer resin, ethylene vinyl acetate and ethylene methyl acrylate;

wherein, if one layer comprises 100 percent of the first polymer resin, or the first polymer resin and second polymer resin are identical, then at least one of the other layers of the multilayer structure is a mixture of the first and second polymer resins; and wherein multilayer coextruded polymer film has at least one textured outer layer.

2. The multilayer co-extruded polymer film of claim 1, wherein the first polymer resin is selected from a terpolymer of ethylene, butene and hexene produced using a metallocene single site catalyst, a copolymer of ethylene and hexene produced using a metallocene single site catalyst and a copolymer of ethylene and butene produced using a metallocene single site catalyst.

3. The multilayer co-extruded polymer film of claim 1, wherein the first polymer resin is a terpolymer of ethylene, butene and hexene formed using a metallocene single site catalyst.

4. The multilayer co-extruded polymer film of claim 1, wherein the second polymer resin is low density polyethylene.

5. The multilayer co-extruded polymer film of claim 1, wherein the first polymer resin is a terpolymer of ethylene, butene and hexene formed using a metallocene single site catalyst, and the second polymer resin is low density polyethylene.

6. The multilayer co-extruded polymer film of claim 1, wherein the first polymer resin is present in each layer in an amount from 70 to 95 percent by weight, and the second polymer resin is present in each layer in an amount from about 30 to 5 percent by weight.

7. The multilayer co-extruded polymer film of claim 1, wherein the first polymer resin is present in each layer in an amount from 85 to 92 percent by weight, and the second polymer resin is present in each layer in an amount from about 15 to 8 percent by weight.

8. The multilayer co-extruded polymer film of claim 1, wherein the multilayer film is a three layer film comprising two outer layers and a central core layer.

9. The multilayer co-extruded polymer film of claim 8, wherein the outer layers each comprise 20 percent of the total thickness of the film and the center layer comprises 60 percent of the total thickness of the film.

10. The multilayer co-extruded polymer film of claim 8, wherein the outer layers comprise a mixture of about 87 percent by weight, relative to the total weight of the outer layer, of the first polymer resin, about 10 percent by weight of the second polymer resin and about 3 percent by weight of additives; and the central core layer comprises a mixture of about 90 percent by weigh, relative to the total weight of the central layer, of the first polymer resin, about 9 percent by weight of the second polymer resin and about 1 by weight percent additives.

11. The multilayer co-extruded polymer film of claim 1, wherein the multilayer film is a five layer film.

12. A multilayer coextruded polymer film, wherein each layer independently comprises:

(1) 70 to 95 percent by weight of a first polymer resin consisting of a terpolymer of ethylene, butene and hexene formed using a metallocene single site catalyst; and (2) 30 to 5 percent of a second polymer resin consisting of low density polyethylene.

13. The film of claim 1, wherein the film has been textured by melt fracturing.

14. A multilayer coextruded polymer film, wherein each layer independently comprises:

(1) 70 to 95 percent by weight of a terpolymer of ethylene, butene and hexene formed using a metallocene single site catalyst; and (2) 30 to 5 percent of a second polymer resin selected from the group consisting of low density polyethylene, linear low density polyethylene, ultra low density polyethylene, very low density polyethylene, a terpolymer of ethylene, butene and hexene produced using a metallocene single site catalyst which is different from that used as the first polymer resin, a copolymer of ethylene and hexene produced using a metallocene single site catalyst which is different from that used as the first polymer resin a copolymer of ethylene and butene produced using a metallocene single site catalyst which is different from that used as the first polymer resin, ethylene vinyl acetate and ethylene methyl acrylate.

* * * * *